3,525,513
VALVING MEANS FOR HYDRAULIC SUSPENSION UNIT

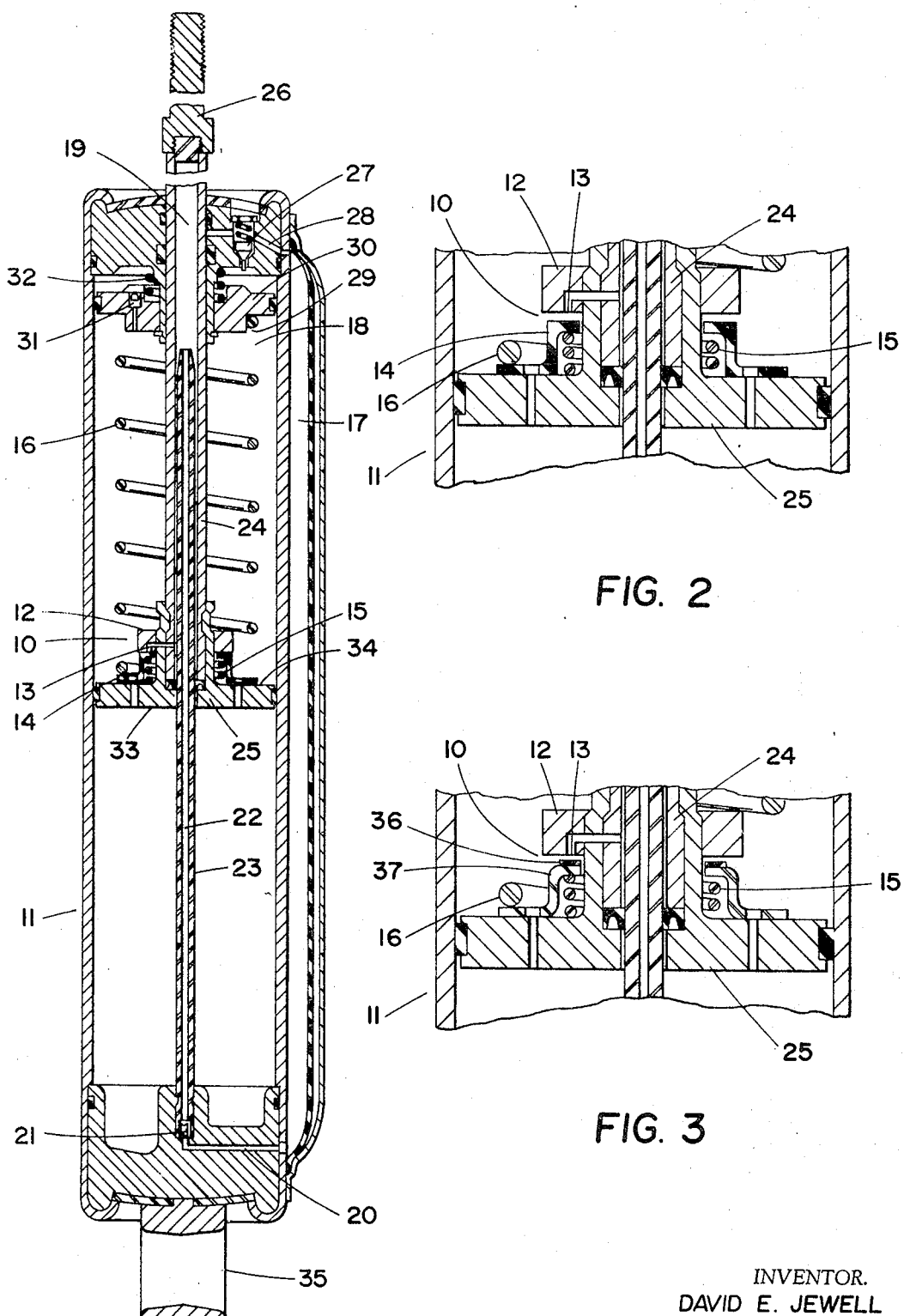

David E. Jewell, Littleton, and Arthur W. Miller, Golden, Colo., assignors to The Gates Rubber Company, Denver, Colo., a corporation of Colorado
Filed Oct. 9, 1968, Ser. No. 766,275
Int. Cl. B60g 11/56
U.S. Cl. 267—64                                        7 Claims

ABSTRACT OF THE DISCLOSURE

A combination check valve and length control means to improve hydraulic circuitry of self-leveling hydraulic suspension units.

---

This application discloses improved valving means for self-leveling suspension units of the type as disclosed in the mutually authored patent application entitled, "Hydraulic Suspension Unit," Ser. No. 707,781.

This invention relates to self-leveling suspension units, but more particularly, this invention relates to valving means operable as a check valve and as a length control means for a self-leveling hydraulic suspension unit.

Suspension units of the self-leveling type may control hydraulic fluid pumping with a check valve, and control the suspension unit neutral length with a length control means. The length control means may be a mechanically operated relief valve, a continuously bleeding orifice or passageway, a clearance between component parts for continual fluid leakage, or a fluid port blockable by a sliding seal.

It is an object of this invention to provide a single valving means for a self-leveling hydraulic suspension unit, said valving means functionable as a check valve and as a length control means.

It is another object of this invention to provide a bifunctional valving means to improve the hydraulic circuitry of a self-leveling suspension unit.

Yet another object of this invention is to provide an economical and reliable valving means for a self-leveling suspension unit.

The improved valving means for a self-leveling suspension unit includes a body portion having a fluid passageway, one end of which defines an aperture, a seal to block the aperture, a first spring means biased against the seal to urge the seal to obstruct the aperture whereby the valving means functions as a check valve and a second spring means biased against the seal to overcome the first spring means and urge the seal away from the aperture when the suspension unit attains a nominal length and whereby the valving means functions as a length control means. Included among the novel features of this invention is an intercommunication of both spring means with the seal to make the invention operable as a check valve or as a length control means.

The scope of this invention is best understood in conjunction with the appended drawings and description thereof.

FIG. 1 is an axial cross-sectional view of a self-leveling hydraulic suspension unit embodying this invention and showing the invention in the check valve mode.

FIG. 2 is a partial view similar to that of FIG. 1 but showing the invention in the length-sensing mode.

FIG. 3 is a view similar to that of FIG. 2 but showing a variation in a sealing means.

Figure 4:
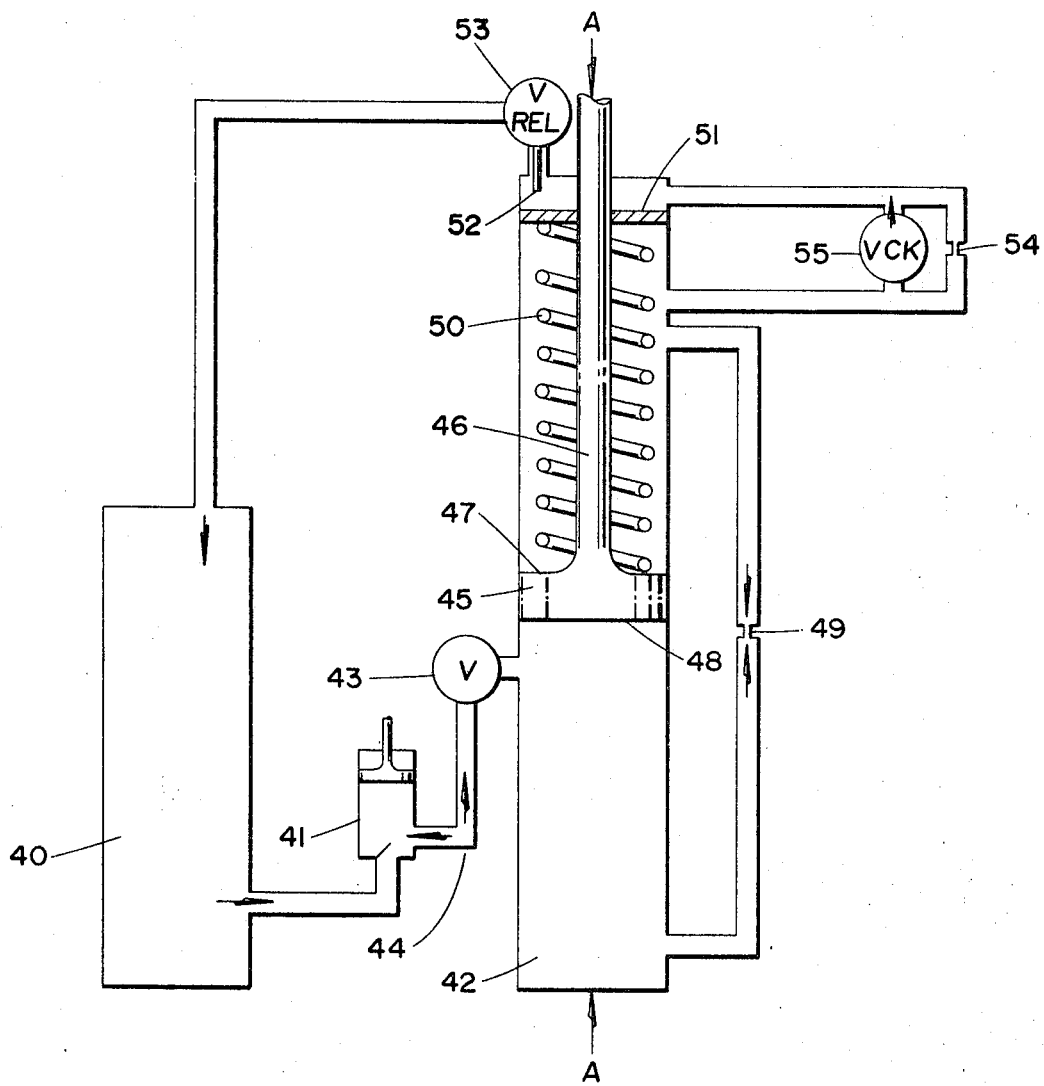
FIG. 4 is a schematical representation of an improved hydraulic circuit for a self-leveling hydraulic suspension unit embodying this invention.

Referring to FIGS. 1 and 2, the improved valving means 10 is shown mounted within a self-leveling hydraulic suspension unit 11. The valving means includes a body 12 having a passageway defining an aperture 13, a seal 14, a check valve spring 15 and a length control spring 16. In the embodiment of this invention as depicted in FIG. 1, the combination including the body 12 having a passageway defining the aperture 13, the seal 14 and check valve spring 15, operates as a pump exit check valve. In the embodiment of this invention as depicted in FIG. 2, the combination including the body 12 having the aperture 13, the seal 14 and length control spring 16, operates as a length control means. Operation of the valving means 10 is best understood in conjunction with the suspension unit.

The suspension unit 11 has three basic fluid chambers through which hydraulic fluid flow is controlled by a plurality of valving and sealing means. The three chambers are: a fluid reservoir 17, a high pressure chamber 18 and a pumping chamber 19. Working fluid flows from the fluid reservoir 17, through conduit 20, past the pump inlet check valve 21 and into the bore 22 of the tubular pumping piston 23. The pump inlet check valve 21 allows unidirectional fluid flow from the reservoir 17 to the pumping chamber 19.

The pumping chamber 19 is defined by the concentric bore of the rod 24. One end of the rod 24 is connected to the damping piston 25 and the other end is connected to the upper mounting attachment 26. The improved valving means is conduitively connected between the pumping chamber 19 and the high pressure chamber 18. Fluid flows from the pumping chamber 19, through the annular clearance between pumping piston 23 and rod 24, through the aperture 13 and past the seal 14 to the high pressure chamber 18. Operating as a pump exit check valve, this invention allows unidirectional fluid flow from the pumping chamber 19 to the high pressure chamber 18.

When this invention operates as a length control means, fluid pumping is stopped. The length control spring 16 overcomes the check valve spring 15 and forces the seal 14 away from the aperture 13 thereby allowing bidirectional fluid flow between the pumping chamber 19 and the high pressure chamber 18.

Fluid flow from the high pressure chamber 18 to the fluid reservoir 17 is through the pressure relief valve 27 and conduit 28. The pressure relief valve 27 may be hydraulically activated when fluid pressure in the high pressure chamber becomes too high. The relief valve 27 may also be mechanically activated by a relief valve actuation means 29 comprising: a relief valve actuator 30, a check valve 31, a return spring 32 and the length control spring 16. The length control spring 16 as depicted performs two functions by (1) biasing against the relief valve actuator 30 and (2) biasing against the seal 14. However, another spring parallel to the length control spring 16 could be included to bias the relief valve actuator 30. Operation of the relief valve actuation means will be explained in conjunction with the suspension unit in use.

Conceivably, a suspension unit incorporating this invention may be used on almost any machine having oscillatory motion between two component members and where it is desired to maintain a neutral point about which relative oscillation should be maintained. For ease of explanation, operation of a suspension unit incorporating this invention will be explained in conjunction with an automotive vehicle.

When the suspension unit 11 is in use, attachment point 26 is secured to the sprung mass of an automotive vehicle whereas the lower attachment point 35 is secured to the unsprung automotive mass. Reciprocatory motion between the two attachment points causes the high pressure chamber 18 to be moved relative to the damping piston rod 23. When the automotive vehicle suspension is loaded, the damping piston 25 is initially disposed in the lower portion of the high pressure chamber 18. As the lower portion of the high pressure chamber 18 moves away from the damping piston 25, the pressure in the pumping chamber 19 will drop to below atmospheric permitting the pump inlet check valve 21 to open and allow fluid to be drawn to the pumping chamber 19 from the fluid reservoir 17. When the motion of the high pressure chamber 18 reverses, the pump inlet check valve 21 closes and fluid pressure in the pumping chamber 19 will rise above the pressure in the high pressure chamber 18 causing the improved valving means 10 to operate as a pump exit check valve by allowing fluid to flow from the pumping chamber 19 to the high pressure chamber 18. As the reciprocatory motion continues, the pressure will rise in the high pressure chamber 18 causing the damping piston 25 to move away from the attachment point 31 because surface area 33 is larger than surface area 34. The portion of the valving means 10 including the body 12, seal 14 and check valve spring 15, will be displaced longitudinally with the damping piston 25. Eventually, the seal 14 will contact the length control spring 16. Pumping action will cease when the length control spring 16 overpowers the check valve spring 15 forcing the seal 14 away from the aperture 13 to allow bidirectional fluid flow between the high pressure chamber 18 and the pumping chamber 19. The valving means 10 is shown in the length control mode in FIG. 2.

Should the rod 24 be overextended such as would occur if mass were removed from the sprung automotive mass, the damping piston will be forced to the upper portion of the high pressure chamber 18 by fluid pressure in the high pressure chamber 18. Length control spring 16 will be compressed against the relief valve actuator 30 to bias the relief valve actuator 30 toward the relief valve 27 to make contact therewith. Fluid will be slowly displaced past the relief valve actuator 30 resulting in slow movement of the relief valve actuator 30. When contact is made, the relief valve 27 will be mechanically unseated to allow fluid to return to the reservoir 17 through conduit 28. Check valve 31 permits the relief valve actuator 30 to rapidly return to a neutral position by opening and allowing a rapid displacement of fluid when the rod 24 is retracted into the high pressure chamber 18.

The seal 14 depicted in FIGS. 1 and 2 is of singular construction. Referring to FIG. 3, another embodiment of this invention includes a seal 36 captivated to a seal retainer 37. The operation of the seal 36 and seal retainer 37 is the same as previously described for the seal 14 of FIGS. 1 and 2.

Referring to FIG. 4, the improved hydraulic circuitry which is attained through the use of this invention, comprises fluid working chambers interconnected with fluid passageways and fluid control means. A hydraulic working fluid is drawn from the fluid reservoir 40 during the intake stroke of the pump 41 and distributed to the high pressure chamber 42 during the discharge stroke of the pump 41. The pump 41 converts reciprocatory mechanical energy into hydraulic potential energy by raising the fluid pressure in the high pressure chamber 42. A valve 43 of the circuit leg 44 operates as the pump 41 exit check valve during the pump up mode of the high pressure chamber 42. When the fluid in the high pressure chamber has attained an operable pressure during the self-leveling mode of the suspension unit the valve 43 performs a second function by opening to permit bidirectional fluid flow between the pump 41 and high pressure chamber 42 which results in deactivation of the pump 41. A piston 45 attached to a rod 46 reciprocates in the high pressure chamber 42. The piston 45 and rod 46 are such that surface area 47 is smaller than surface area 48; the differential or projected surface area corresponds to the cross-sectional area of the rod 46. A compressive force A—A applied to the rod 46 and high pressure chamber 42 is hydraulically balanced by the high pressure fluid reacting on the differential surface area. Damping of the reciprocating piston 45 is hydraulically controlled by the orifice 49.

Should the compressive load A—A be reduced or removed, piston 45 will be hydraulically forced toward the upper region of the high pressure chamber 42. Such piston movement will compress spring 50 against the relief valve actuator 51 to bias said relief valve actuator 51 toward the mechanical release 52 of the relief valve 53. Fluid will be slowly displaced through the orifice 54 resulting in slow movement of the relief valve actuator 51. When contact is made, the relief valve 54 will be mechanically unseated to allow fluid to return to the reservoir 40. Check valve 55 permits the relief valve actuator 51 to rapidly return to a neutral position by opening and allowing a rapid displacement of fluid when the rod 46 is retracted into the high pressure chamber 42. Relief valve 54 may also be actuated by high fluid pressure which would jeopardize the integrity of the high pressure chamber 42.

We claim:

1. An improved hydraulic control circuit for a self-leveling hydraulic suspension unit having extensible and nonextensible mounting members, said circuit containing a fluid and having:

a fluid reservoir;

a reciprocating hydraulic pump including a pump inlet check valve;

an interconnecting conduit between the fluid reservoir and reciprocating hydraulic pump;

a fluid receiving, variable volume, high pressure chamber;

a hydraulic reacting surface area disposed within the high pressure chamber and attached to the extensible member, the surface area defining a projected area equivalent to the protruding cross-sectional area of the extensible member;

a pressure relief valve interconnected by conduit between the fluid receiving high pressure chamber and the fluid reservoir, the pressure relief valve controlling the high limit pressure of the high pressure chamber and controlling unidirectional fluid flow to the fluid reservoir;

wherein the improvement comprises:

a dual functioning circuit leg between the reciprocating pump and the high pressure chamber, said circuit leg including a valve interconnected by conduit be-between the reciprocating pump and high pressure chamber, said valve controllable as a pump exit check valve allowing unidirectional fluid flow from the reciprocating pump to the high pressure chamber during the pump up mode of the high pressure chamber, and said valve secondarily controllable as an open valve allowing bidirectional fluid flow between the reciprocating pump and high pressure chamber during the self-leveling mode of the suspension unit.

2. In a self-leveling hydraulic suspension unit of the type having a fluid containing high pressure chamber to sustain the leveling mode of the suspension unit, and having a self-contained reciprocating hydraulic pump discharging to pressurize the high pressure chamber, the improvement comprising:

a valving means physically and fluidically interfaced between a discharge side of the reciprocating hydraulic pump and the high pressure chamber, said valving means comprising a body having a passageway with one end opening to receive the discharge of the reciprocating hydraulic pump and the other end defining an aperture to the high pressure chamber, seal means capable of blocking the aperture, a first spring means biased against said seal means to bias said sealing means to block the aperture whereby the said valving means performs the function as the reciprocating hydraulic pump discharge check valve allowing unidirectional fluid flow from the reciprocating hydraulic pump to the high pressure chamber, and a second spring means capable of biasing against said seal means during the self-level mode of the suspension unit, and overcoming said first spring means to allow bidirectional fluid flow between the reciprocating hydraulic pump and the high pressure chamber.

3. A claim according to claim 2 wherein said sealing means comprises a seal capable of blocking the aperture, and a seal retainer mounting said seal, said seal retainer capable of engaging and receiving the biasing of said first spring means and said second spring means.

4. A self-leveling hydraulic suspension unit of the type having:
  a tubular body closed at its ends, the first end defining a first mounting extremity, and said tubular body defining a high pressure chamber;
  a rod reciprocally extensible through the second end of said tubular body, the second end of said rod defining the second mounting extremity, said rod having a concentric bore, defining a pumping chamber;
  seal means between said rod and the second end of said tubular body, said seal means captivated to the second end of said tubular body;
  a damping piston attached to the first end of said rod, said damping piston disposed within said tubular body;
  a tube affixed to the first end of, and disposed within said tubular body, said tube having a smaller diameter than the concentric bore of said rod, said tube defining a pumping piston that protrudes into the pumping chamber;
  a fluid reservoir mounted to said tubular body, said reservoir having an exit opening conduitively connected to said tube, and having an entrance opening conduitively connected to said high pressure chamber;
  check valve means disposed within the conduit between the exit opening of said fluid reservoir and said tube;
  relief valve means disposed within the conduit between the entrance opening of said fluid reservoir and said high pressure chamber, said relief valve means operable both hydraulically and mechanically from said high pressure chamber;
  relief valve actuation means disposed within the high pressure chamber between said relief valve and said damping piston, said relief valve means capable of mechanically engaging and activating said relief valve when said rod is over extended;
wherein the improvement comprises:
  a valving means conduitively interfaced between said pumping chamber and said high pressure chamber, said valving means comprising a body having a passageway with one end opening to receive the discharge of the reciprocating pump and the other end defining an aperture to the high pressure chamber; seal means capable of blocking the aperture; a first spring means biased against said seal means to bias said seal means to block the aperture whereby said valving means is functionable as a check valve; and a second spring means capable of biasing against said seal means during the self-level mode of the suspension unit, and overcoming said first spring means whereby said valving means is functionable as an open valve.

5. A claim according to claim 4 wherein said sealing means comprises a seal capable of blocking the aperture, and a seal retainer mounting said seal, said seal retainer capable of engaging and receiving the biasing of said first spring means and said second spring means.

6. In a hydraulic suspension unit of the self-leveling, damping and liquid spring type, the combination comprising:
  a tubular body closed at its ends, the first end defining a first mounting extremity, and said tubular body defining a high pressure chamber;
  a rod reciprocally extensible through the second end of said tubular body, the second end of said rod defining the second mounting extremity, said rod having a concentric bore, defining a pumping chamber;
  seal means between said rod and the second end of said tubular body, said seal means captivated to the second end of said tubular body;
  a damping piston attached to the first end of said rod, said damping piston disposed within said tubular body;
  a tube affixed to the first end of, and disposed within said tubular body, said tube having a smaller diameter than the concentric bore of said rod, said tube defining a pumping piston that protrudes into the pumping chamber;
  a fluid reservoir mounted to said tubular body, said reservoir having an exit opening conduitively connected to said tube, and having an entrance opening conduitively connected to said high pressure chamber;
  check valve means disposed within the conduit between the exit opening of said fluid reservoir and said tube;
  relief valve means disposed within the conduit between the entrance opening of said fluid reservoir and said high pressure chamber, said relief valve means operable both hydraulically and mechanically from said high pressure chamber;
  relief valve actuation means disposed within the high pressure chamber between said relief valve and said damping piston, said relief valve means capable of mechanically engaging and activating said relief valve when said rod is over extended;
  a valving means conduitively interfaced between said pumping chamber and said high pressure chamber, said valving means comprising a body having a passageway with one end opening to receive the discharge of the reciprocating pump and the other end defining an aperture to the high pressure chamber; seal means capable of blocking the aperture; a first spring means biased against said seal means to bias said seal means to block the aperture whereby said valving means is functionable as a check valve and a second spring means capable of biasing against said seal means during the self-level mode of the suspension unit, and overcoming said first spring means whereby said valving means is functionable as an open valve.

7. A claim according to claim 6 wherein said sealing means comprises a seal capable of blocking the aperture, and a seal retainer mounting said seal, said seal retainer capable of engaging and receiving the biasing of said first spring means and said second spring means.

References Cited

UNITED STATES PATENTS

| | | | |
|---|---|---|---|
| 3,147,826 | 9/1964 | McHenry | 267—64 |
| 3,399,882 | 9/1968 | Hausmann | 263—64 |

JAMES B. MARBERT, Primary Examiner